April 28, 1964 L. C. CHOUINGS 3,130,551
VALVE MECHANISM FOR CONTROLLING SERVO DEVICES OF THE DIFFERENTIAL AIR PRESSURE TYPE
Filed Feb. 10, 1961 2 Sheets-Sheet 1

INVENTOR
Leslie Cyril Chouings
BY
Stevens Davis Miller & Mosher
ATTORNEYS

INVENTOR
Leslie Cyril Chouings
BY
Stevens Davis Miller & Mosher
ATTORNEYS 3,130,551
Patented Apr. 28, 1964

3,130,551

VALVE MECHANISM FOR CONTROLLING SERVO DEVICES OF THE DIFFERENTIAL AIR PRESSURE TYPE

Leslie Cyril Chouings, Leamington Spa, England, assignor to Automotive Products Company Limited, Leamington Spa, England Filed Feb. 10, 1961, Ser. No. 88,372
Claims priority, application Great Britain Feb. 11, 1960
5 Claims. (Cl. 60—54.5)

This invention relates to valve mechanism for controlling servo devices of the differential air pressure type such as are used in association with liquid pressure systems, for example liquid pressure braking systems.

In such servo devices, the valve mechanism operates to control the air pressure acting on one side of a piston or diaphragm constituting the movable member of the servo device so as to raise or lower the said pressure when operation of the servo device is required, and thus produce the pressure differential to move the said piston or diaphragm, the valve mechanism including inlet and outlet valves which are displaced by an operator applied thrust to bring the servo device into operation and are so responsive to pressure produced by the servo device that they tend to move towards a lapped position in which both are closed and a pressure proportional to the operator applied thrust is exerted by the servo device.

According to the present invention, in valve mechanism for controlling the air pressure acting in a chamber on one side of the piston or diaphragm constituting the movable member of a servo device of the differential air pressure type, a valve operable to connect the said chamber to a source of pressure equal to that existing on the other side of the movable member, and a valve operative to connect the said chamber to a source of higher or lower pressure are connected one to the other by a yoke or rocking member operable by an operator applied effort to first close the first of said valves and then open the second of said valves, operation of the servo-motor producing a reaction opposing said effort and tending to restore the said valves to their normal positions.

An embodiment of the invention will now be described by way of example by aid of the accompanying diagrammatic drawings in which:

FIGURES 3 and 4 are fragmentary end and plan views respectively showing the yoke mounting.

Figure 1:
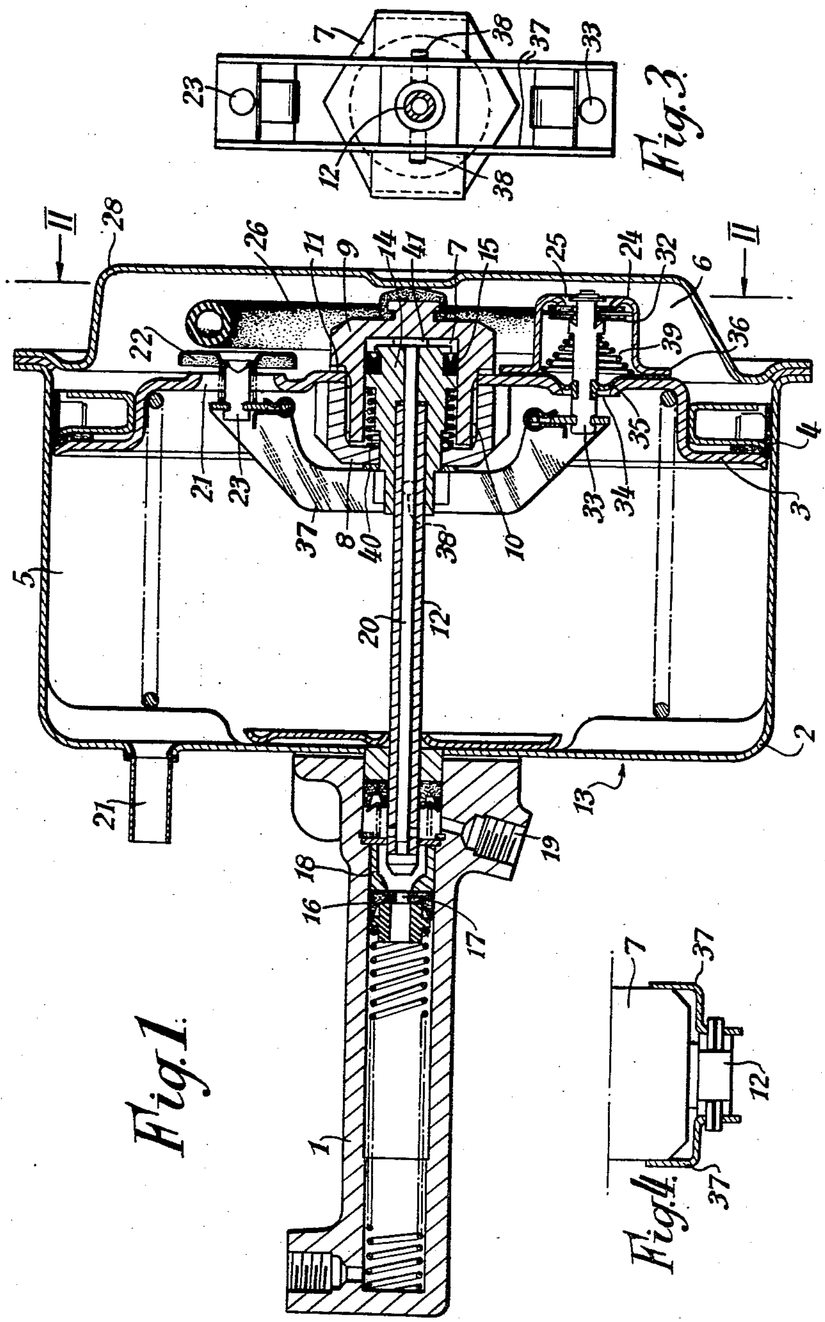
FIGURE 1 is a section through a vacuum-servo device.
Figure 2:
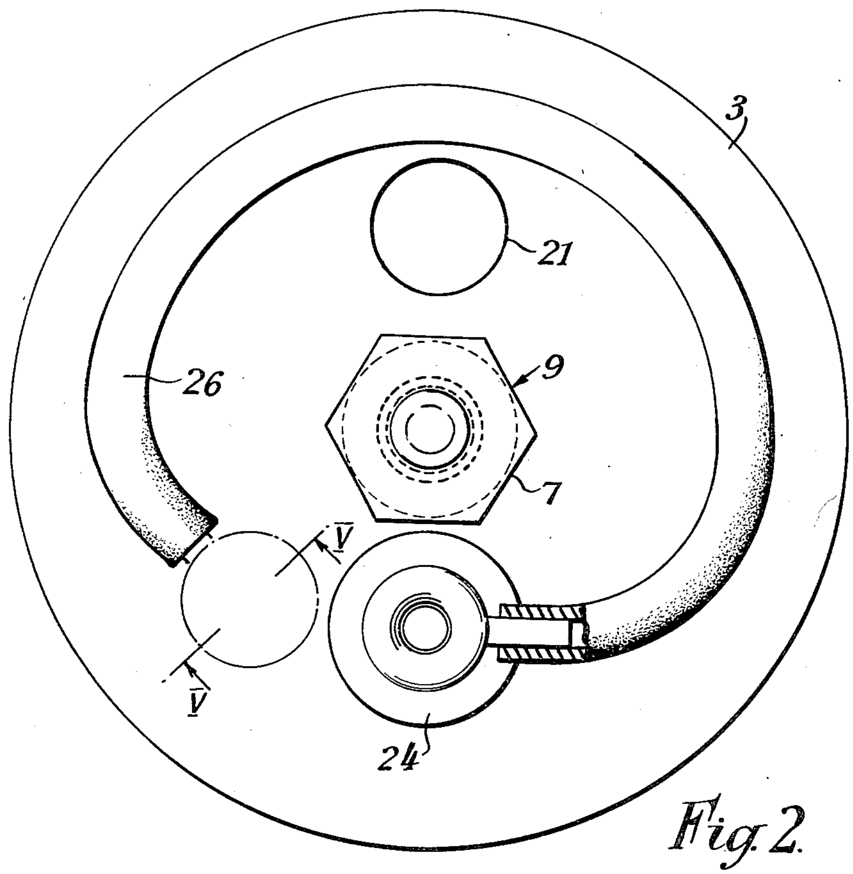
FIGURE 2 is an end view on the line II—II of FIGURE 1.
Figure 5:
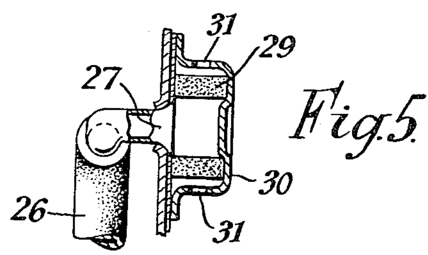
FIGURE 5 is a view on the line V—V of FIGURE 2.

The drawings show a vacuum servo device of the so-called "vacuum suspended" type in which chambers on both sides of the piston of the servo device are normally connected to a source of suction and operation of the servo device is effected by isolating one of the chambers from the source of suction and connecting it to the atmosphere.

For the purposes of the present embodiment the servo device is assumed to be embodied in a liquid pressure braking system of a vehicle, the servo device having mounted co-axially with it a liquid pressure master cylinder 1 in which pressure is built up by the operation of the servo device to operate the vehicle brakes. Operation of the servo device is controlled by a pedal operated master cylinder, not shown, the arrangement being of the known type in which initial operation of the pedal operated master cylinder builds up pressure in the servo operated master cylinder 1 which has a port connectable to the pedal operated master cylinder and the brakes and also operates the control valve of the servo device to bring the said servo device into action and increase the pressure in the servo operated master cylinder as compared with the pressure in the pedal operated master cylinder.

The servo device comprises a cylindrical casing 2 conveniently formed of sheet metal pressings and having slidable therein a spring loaded piston 3 provided with a sealing washer 4 on its edge engaging the cylindrical wall of the casing, the space on either side of the piston being referred to as a first space 5 and a second space 6. At the centre of the piston there is mounted a hollow member constituting a cylinder 7 co-axial with the piston. The cylinder 7 is made in two parts 8 and 9 the two parts having interengaging threads 10 so that they can be screwed together and clamp the piston between them a washer 11 providing a fluid tight joint. A rod 12 extends through one end wall 13 of the casing 2 of the servo device through the space 5 and into the cylinder 7, the end of the rod projecting into the cylinder 7 being provided with a head 14 fitting slidably in the cylinder 7 and making a fluid tight joint with the wall thereof by means of sealing member 15.

To the end wall 13 of the casing of the servo device through which the rod 12 extends, there is secured co-axially the liquid pressure master cylinder 1 the piston 16 of which has a passage 17 extending axially through it, and the adjacent end of the rod 12 is adapted on forward movement of the said rod to the left in FIGURE 1 to close the passage 17 in the master cylinder piston.

A chamber 18 in the master cylinder behind the piston 16 thereof is connectable to the pedal operated master cylinder which controls the braking system through the port 19 and this chamber 18 is in communication, through a co-axial bore 20 in the rod 12, with the cylinder 7 at the centre of the servo piston.

The chamber 5 in the casing of the servo device adjacent the end thereof to which the master cylinder 1 is secured is permanently connectable by port 21 to a source of suction such as the inlet manifold of the engine of the vehicle on which the braking system is provided and valve means hereinafter described, carried by the servo piston provide for the connection of this chamber to the chamber 6 at the other end of the casing of the servo device or for the connection of the latter chamber to the atmosphere. Connection between the chambers 5 and 6 in the casing of the servo device is provided by an eccentrically positioned aperture 21 in the piston adapted to be closed by a disc valve 22 situated in the second chamber 6 and mounted on one end of a valve stem 23 extending through the aperture 21. There is also mounted on the piston so as to project into the second chamber 6, a cup-like valve housing 24 having an aperture 25 in its end remote from the piston, the interior of the said cup-like housing being connected by a flexible conduit 26 in the second chamber 6 to an air inlet orifice 27 in the end wall 28 of that chamber the air drawn through the inlet orifice passing first through a filter 29 contained in a housing 30 secured to the exterior of wall 28 and provided with inlet apertures 31 for air. A disc valve 32 controlling the aperture 25 in the end of the wall of the cup-like housing 24 is carried by a stem 33 which projects through an aperture 34 in the servo piston, a diaphragm 35 extending between the stem and a flange 36 on the cup-like housing 24 being clamped by the said flange against the piston to form a fluid tight joint between the said stem 33 and the piston.

The two apertures 21 and 25 in the piston are on a common diameter thereof and on opposite sides of its centre and a yoke 37 pivotally mounted on pivots 38 on the rod 12 for movement in a diametral plane of the servo piston is connected at one end to the stem 33 of the valve 32 controlling the aperture in the cup-like housing 24 and at the other end to the stem 23 on the disc valve 22 controlling the aperture 21 which connects the two chambers 5 and 6 in the servo device. The valve 32 controlling the aperture 25 in the cup-like housing 24 is urged to seat against the rim of the aperture therein by a spring 39, but the other valve 22 has no closing bias. The stems 23, 33 of both valves are arranged for limited rocking movement relative to the yoke 37 whereby they are free for even engagement with their seatings.

The head 14 on the end of the rod 12 is urged by a spring 40 away from the end 13 of the casing of the servo device to which the master cylinder 1 is attached and the parts are so adjusted that when there is no liquid pressure in the system the head 14 engages an abutment 41 so as to maintain the yoke 37 in such a position that the aperture 21 connecting the two chambers 5 and 6 in the casing of the servo device is open, the aperture 25 in the cup-like housing 24 being closed by the valve 32 associated therewith which is subjected to the spring bias of spring 39.

Pressure created in the pedal operated master cylinder acts in the servo operated master cylinder 1 and is transmitted therethrough to the motor cylinders operating the brakes of the vehicle, this pressure being also transmitted through the bore 20 in the rod 12 to the cylinder 7 at the centre of the servo piston where it acts on the head 14 of the rod 12 and tends to displace the said rod towards the servo operated master cylinder to the left of FIGURE 1. The yoke 37, since it is pivoted to the rod 12, tends to move with it and, owing to the absence of closing bias on the valve 22 controlling the aperture 21 connecting the two chambers 5 and 6 in the casing of the servo device, this valve is first seated to isolate the chambers one from the other. Further movement of the rod 12 relative to the servo piston tends to open the valve 32 controlling the aperture 25 in the end of the cup-like housing 24 and admits atmospheric pressure to the second chamber 6 of the servo device, thereby creating a pressure differential across the piston of the servo device tending to move that piston and the rod 12 towards the servo operated master cylinder. Such movement causes the end of the rod 12 to close the passage 17 in the piston 16 of the servo operated master cylinder, and further movement of the piston of the servo device builds up pressure in the said servo operated master cylinder greater than that exerted by the pedal operated master cylinder. This pressure, acting through the rod 12 on the head 14 thereof, produces a force opposing the force produced by the pressure from the pedal operated master cylinder acting in the cylinder 7 at the centre of the servo piston, that cylinder having a diameter greater than that of the piston 16 in the servo operated master cylinder so that the two forces will balance one another when the pressure in the servo operated master cylinder 1 exceeds that created by the pedal operated master cylinder by a predetermined ratio. When such ratio is reached the rod 12 tends to move backwardly to the right in FIGURE 1 relative to the servo piston with the result that the valve 32 controlling the aperture 25 in the cup-like housing 24 tends to close and prevent further increase of the pressure difference in the servo device. Thus the pressure generated by the servo device is governed by the pressure exerted by the pedal operated master cylinder and the braking will be progressive in accordance with the pedal pressure exerted by the operator.

When pressure in the pedal operated master cylinder is released the rod 12 returns to its normal position relative to the servo motor piston and both valves 22 and 32 revert to their normal positions so that the pressure in the second chamber 6 of the servo device is reduced to correspond with that in the first chamber 5 and the brakes are released.

The valve arrangement according to the invention is compact and efficient, and owing to the lack of any opening bias on the valve connecting the two chambers of the servo device, rapid initial operation is assured so that effective operation of the brakes follows quickly on operation of the pedal.

It will be understood that by suitable modification of the valve arrangement it can be applied to servo devices of the type in which both chambers are normally connected to the atmosphere and one of them is connected to a source of suction when the servo device is required to operate. Similarly, a corresponding valve arrangement may be used in the servo device in which both chambers are normally connected to atmosphere and operation is effected by connecting one of them to a source of compressed air.

I claim:

1. A servo device comprising a master cylinder having a piston mounted therein, a fluid inlet at one end of said master cylinder and a fluid discharge at the opposite end of said master cylinder with said piston positioned therebetween, a servo device including a casing secured to said master cylinder, said servo device being of the differential air pressure type and having a piston-like movable member in said casing, valve mechanism for controlling the air pressure acting in a chamber on one side of the movable member comprising a normally open first valve operative to connect said chamber to a source of pressure equal to that existing on the other side of the movable member, and a normally closed second valve operative to connect said chamber to a source of differential pressure, each of said valves consisting of a port in the movable member and a movable valve member cooperating therewith, said valve members being connected one to the other by a rocking member, a control cylinder carried by said movable member, a control piston in said control cylinder having an opening therethrough, a tube rigidly connected to said control piston in communication with said piston opening, the other end of said tube opening into said master cylinder in opposed relation to said master cylinder piston and in communication with said master cylinder intermediate said master cylinder piston and said fluid inlet, and means pivotally mounting said rocking member on the combined tube and control piston.

2. The servo device of claim 1 wherein said master cylinder piston has an opening therethrough and said tube has a closed end for closing said master cylinder piston opening.

3. A servo-assisted pressure braking means for a hydraulic brake system comprising a master cylinder having a piston movable therein, operating means for said master cylinder, a vacuum type servo unit including a servo cylinder having first and second end walls and a servo piston dividing the servo cylinder into first and second chambers each bounded by one of said end walls, suction producing means operatively connected to said first chamber in said servo cylinder between the servo piston and said first end wall thereof, said master cylinder disposed substantially in the central portion of said first end wall, first and second apertures disposed in said servo piston in substantially diametrical relationship, a cylinder member disposed in the central portion of said servo piston between said apertures, a rod having an axial bore therethrough, one end of said rod being disposed in said master cylinder while the other end of said rod includes a piston member within said cylinder member, a first valve member for said first aperture and a second valve member for said second aperture, said first aperture communicating said chambers, means connecting said second aperture to atmospheric pressure, said first valve member being normally open while said second valve member is normally closed, and a yoke member pivotally disposed on said rod having means for mounting said valve members thereto so that upon actuation of said brake system said rod is movable toward said master cylinder to cause said yoke to move the first valve member over the first aperture to place said first chamber in communication with the suction producing means and after a predetermined movement of said rod said second valve member opens said second aperture admitting atmospheric pressure in said second chamber to move said servo piston until pressure equalization on each side thereof is obtained.

4. A servo-assisted pressure braking means according to claim 3 in which said second aperture is disposed in a valve housing and said atmospheric connecting means includes a flexible conduit connected to said valve housing and an inlet orifice disposed in said second end wall.

5. A servo-assisted pressure braking means according to claim 3 in which said master cylinder has a chamber into which the one end of said rod is disposed, the piston of said master cylinder has a passage extending axially therethrough in line with said rod, the one end of said rod engaging said passage upon said servo piston moving theretoward to close said passage.

References Cited in the file of this patent

UNITED STATES PATENTS

| | | |
|---|---|---|
| 2,627,726 | Rockwell | Feb. 10, 1953 |
| 2,812,639 | Whitten | Nov. 12, 1957 |
| 2,924,072 | Burwell | Feb. 9, 1960 |
| 2,932,283 | Jeffrey | Apr. 12, 1960 |

FOREIGN PATENTS

| | | |
|---|---|---|
| 514,917 | Great Britain | Nov. 21, 1939 |